Aug. 24, 1926.

J. G. LAUBINGER 1,597,449

ALTERNATING CURRENT MOTOR

Filed Dec. 31, 1924

Inventor:
Johann G. Laubinger,
by
His Attorney.

Patented Aug. 24, 1926.

1,597,449

UNITED STATES PATENT OFFICE.

JOHANN GEORG LAUBINGER, OF WAIDMANNSLUST, GERMANY, ASSIGNOR TO GENERAL ELECTRIC COMPANY, A CORPORATION OF NEW YORK.

ALTERNATING-CURRENT MOTOR.

Application filed December 31, 1924, Serial No. 759,179, and in Germany March 28, 1924.

My invention relates to alternating current motors, and especially to induction motors which are provided with regulating or adjusting windings for supplying the motor magnetizing current.

It is well known that the current supplied to an induction motor lags somewhat behind the impressed voltage due to the fact that the magnetizing current of the motor must be supplied through its primary winding. This phase difference between the impressed voltage and the primary current is not constant but decreases as full load of the motor is approached. For this reason a leading component voltage of variable magnitude is required to produce unity power factor at the different motor loads. In the past various arrangements have been proposed and used for improving the power factor at which current is utilized by an induction motor. In some of these arrangements a regulating or adjusting winding inductively associated with the motor primary winding has been arranged to impress on the motor secondary winding component voltages which lead the secondary induced voltage in phase and are adapted to produce in the secondary circuit currents by which the power factor of the motor is improved. Upon the reversal of a motor comprising an adjusting winding, difficulty is encountered due to the fact that voltage applied to the secondary circuit by the adjusting winding lags behind the secondary induced voltage when the phase rotation of the motor primary winding is reversed. In order to ensure proper functioning of the adjusting winding with both directions of motor rotation, it is therefore necessary to provide means for readjusting the phase relation of the secondary component voltages upon reversal of the motor. This may be accomplished by shifting the brushes of the adjusting winding in a well known manner, but where the motor is operated in a location not readily accessible, as on a traveling crane for example, this method of control is not convenient. My invention has for its object the provision of an improved arrangement whereby a motor comprising an adjusting winding may be readily reversed and controlled from a location situated at a distance from the motor.

My invention will be better understood from the following description when considered in connection with the accompanying drawing and its scope will be pointed out in the appended claims.

Figure 1:
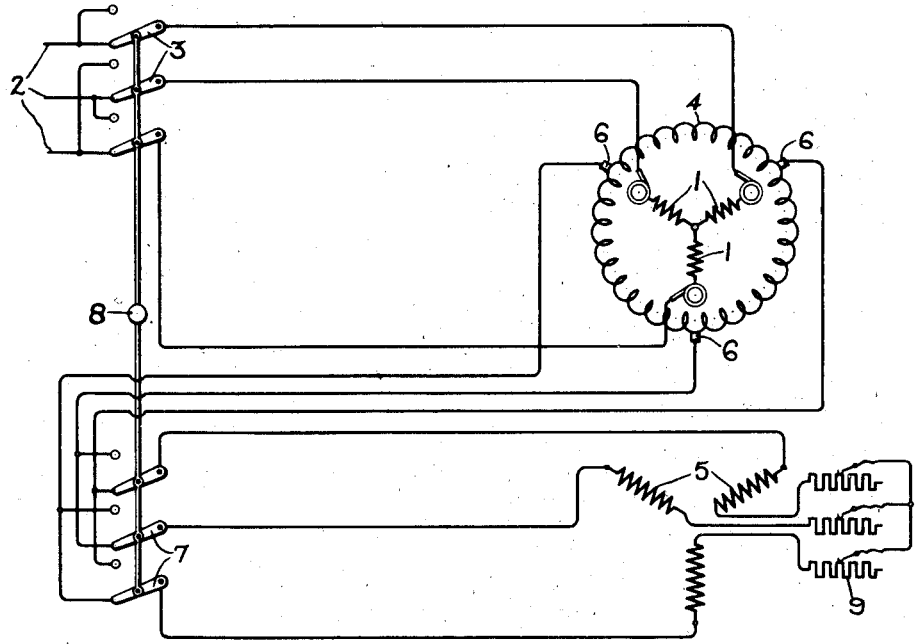
Figure 2:
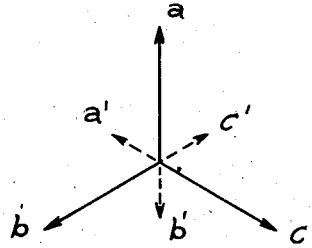

Referring to the drawing, Fig. 1 shows an arrangement in which my invention has been embodied; and Fig. 2 is a vector diagram illustrating the phase relations existing between the secondary component voltages.

Fig. 1 shows a motor comprising a primary winding 1 arranged to be supplied with current from a polyphase line 2 through a reversing switch 3. The winding 1 is shown as mounted on the rotor member of the motor and is inductively related to an adjusting winding 4 which is arranged to be connected with the motor secondary winding through brushes 6 and a switch 7. The switch 7 may be mechanically coupled to the reversing switch 3 through a bar 8 if desired, and is provided for shifting the voltages applied to the secondary winding 5 by the adjusting winding 4 through a phase angle of 120 electrical degrees with respect to the secondary induced voltage. In cases where it is desired to vary the motor speed or to accelerate the motor when subjected to a heavy load, an adjustable resistor 9 may be interposed in the neutral connection of the secondary winding 5.

Assuming the line 2 to be energized and the switches 3 and 7 to be closed in their illustrated positions, the polyphase voltages induced in the secondary winding 5 may be represented by the vectors $a$, $b$ and $c$ and those applied to this winding by the adjusting winding 4 may be represented by the vectors $a'$, $b'$ and $c'$. Assuming counter clockwise rotation, it will be observed that the vector $a'$ leads the vector $a$ by 60 degrees and that the vectors $b'$ and $c'$ lead the vectors $b$ and $c$ respectively by a like angle. If the phase rotation of the primary winding 1 is now reversed by operation of the reversing switch 3, the phase rotation of both secondary component voltages is reversed. Under these conditions the voltages represented by the vectors $a'$, $b'$ and $c'$ lag behind the voltages represented by the vectors $a$, $b$ and $c$. This is of course objectionable for the reason that the power factor of the motor is made poorer instead of better.

In order to restore the proper phase relation between the secondary component voltages, it is necessary that the polyphase induced voltages be combined with polyphase voltages which lead them in phase. This requires that the voltages $c'$, $b'$ and $a'$ be combined with the voltages $a$, $c$ and $b$ respectively for reverse rotation of the motor. This change in relation is readily accomplished by the switch 7 which is arranged to change the connections between the adjusting and secondary windings in a manner to shift the secondary applied voltages through a phase angle of 120 electrical degrees with respect to the secondary induced voltages, or to use general language, to shift the secondary applied voltages through a phase angle of 360 electrical degrees divided by the number of phases of the machine. The switch 7 therefore affords a simple and reliable means of maintaining the proper phase relation between the induced and applied secondary voltages regardless of the direction of motor rotation and has the advantage that it may be located at a point convenient to the operator.

As will be evident to those skilled in the art, it is not essential to my invention that a mechanical coupling be interposed between the reversing and secondary winding switches nor that a resistor be provided in the secondary circuit.

What I claim as new and desire to secure by Letters Patent of the United States is:

1. A polyphase induction motor having relatively rotatable primary and secondary windings, a source of supply for said motor, means for supplying polyphase exciting current to said secondary winding, such excitation being derived from said polyphase source through the primary winding of said motor, and means for simultaneously reversing the phase rotation of said primary winding and shifting the phase of the exciting voltage applied to said secondary winding through an angle corresponding to 360 electrical degrees divided by the number of motor phases.

2. A polyphase motor having primary rotor and secondary stator winding members, a commutator on said rotor member associated with a winding thereon, polyphase connections between said commutator and the secondary winding member of said motor for supplying exciting current to the secondary winding, switching means in said connections for shifting the connections through a phase angle corresponding to 360 electrical degrees divided by the number of motor phases, a source of supply for said motor, switching means for reversing the phase rotation of said motor, and means for simultaneously operating both of said switching means.

In witness whereof, I have hereunto set my hand this 10th day of December, 1924.

JOHANN GEORG LAUBINGER.